United States Patent [19]

Shelton

[11] Patent Number: 5,179,786
[45] Date of Patent: Jan. 19, 1993

[54] MEASURING APPARATUS WITH TEMPERATURE CONTROL

[76] Inventor: Russell S. Shelton, 9 Park Ave., Flanders, N.J. 07836

[21] Appl. No.: 688,432

[22] Filed: Apr. 22, 1991

[51] Int. Cl.⁵ ............................ G01B 3/30; G01B 5/00
[52] U.S. Cl. .................................. 33/503; 33/702
[58] Field of Search ............... 33/503, 504, 505, 700, 33/702, 1 M, 803, 783, DIG. 19

[56] References Cited

U.S. PATENT DOCUMENTS 4,083,272  4/1978  Miller.
5,027,527  7/1991  Dorris ................................ 33/783

FOREIGN PATENT DOCUMENTS 3437196  5/1986  Fed. Rep. of Germany ........ 33/702
8802096  3/1988  World Int. Prop. O. ............ 33/702

OTHER PUBLICATIONS

NESLAB Recirculating Chillers 1990/91 (Catalog).
NESLAB 1990/91 Constant Temperature Bath/Circulators and Immersion Coolers.

Primary Examiner—Harry N. Haroian
Attorney, Agent, or Firm—Beveridge, DeGrandi & Weilacher

[57] ABSTRACT

In measuring apparatus, a workpiece-contacting probe is mounted on a probe-supporting assembly which is maintained at a constant temperature by bathing it with liquid. The liquid is supplied at a constant temperature by a heat exchanger system which also supplies liquid to hydrostatic bearings in the probe-supporting assembly. Before being measured, the workpieces are immersed in a bath which is maintained at a constant temperature. Liquid is fed into the immersion bath by a probe provided with liquid outlets which can be directed against selected areas of a submerged workpiece.

12 Claims, 3 Drawing Sheets

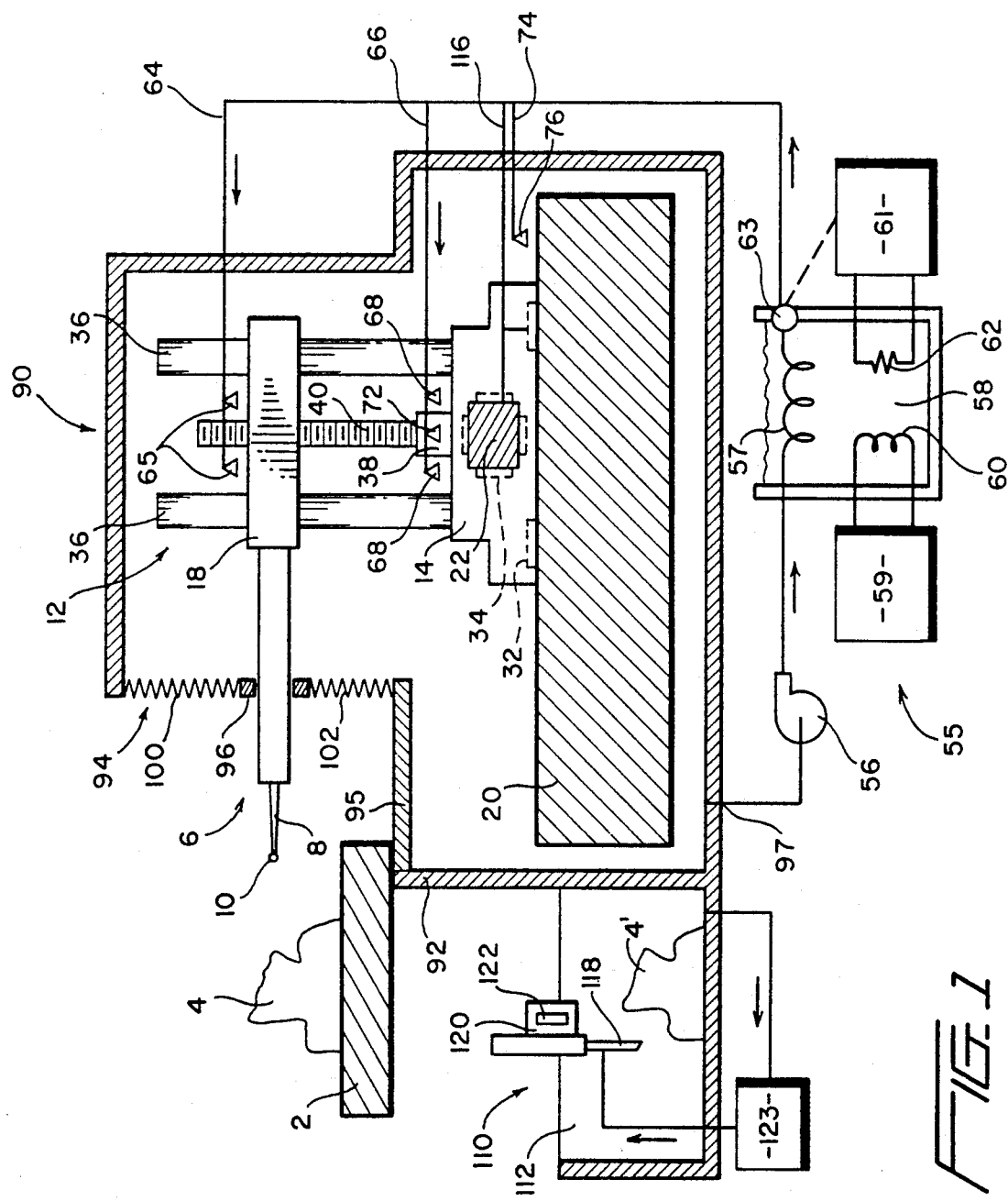

MEASURING APPARATUS WITH TEMPERATURE CONTROL

BACKGROUND OF THE INVENTION

This invention relates to precision measuring apparatus, primarily coordinate measuring machines in which a probe assembly is mounted on a probe-supporting assembly which permits movement of the probe to positions where the probe stylus contacts a workpiece. The position of the probe when it contacts a workpiece is determined from position-sensing means provided in the apparatus.

In particular, the invention involves such measuring apparatus which is thermally stabilized to minimize errors attributable to thermal expansion or contraction.

The metrology industry has recognized the desirability of maintaining such apparatus at a constant temperature and, toward this end, coordinate measuring machines are often located in special rooms which are maintained at precisely controlled air temperatures. It is expensive to construct and operate such rooms, and their locations are not always convenient to the individuals who need to know the results of the measurements.

The present invention makes it possible to provide precise measuring apparatus at substantially any location in a factory, without also providing for precise control of room air temperature. The invention is less expensive and more convenient than a temperature controlled room, and is capable of providing comparable accuracy.

SUMMARY OF THE INVENTION

The invention is applicable to known measuring apparatus in which a probe assembly is mounted on a probe-supporting assembly, the latter including guide means for guiding the probe assembly for movement along a set of coordinate axes. In a conventional manner, position-sensing means are used to provide values indicative of the positions of the probe when it contacts a workpiece. According to the invention, means are provided for bathing the probe-supporting assembly in a liquid heat transfer medium, and means are provided for controlling the temperature of the liquid heat transfer medium to maintain it at a constant temperature to prevent thermal expansion and contraction of the probe-supporting assembly.

Preferably, the probe-supporting assembly is bathed by liquid from a plurality of liquid outlet openings which are directed toward different areas of the probe-supporting assembly. The probe-supporting assembly can be enclosed in a housing which deters the loss of liquid and shields the assembly from ambient air currents. A wall of the housing may have an opening through which the probe assembly extends, and deformable components in this wall enable the opening and the probe assembly to move parallel to the wall. These deformable components may be accordion-pleated wall sections.

Preferably, a thermostatically controlled heat exchanger receives liquid from an outlet opening in the housing, and the outlet of the heat exchanger supplies the bathing liquid to the probe-supporting assembly and to the workpiece bath.

For purposes of stabilizing a workpiece thermally and dimensionally prior to measurement, the apparatus includes a premeasurement treatment device including a vessel containing a bath of immersion liquid in which the workpiece is submerged. The immersion liquid is maintained at a substantially constant temperature.

BRIEF DESCRIPTION OF THE DRAWINGS

FIG. 1 is a diagrammatic side view of a measuring apparatus constructed according to the invention.

DETAILED DESCRIPTION

In a normal workplace environment, a coordinate measuring machine is subjected to temperature changes which adversely affect its performance. This problem has been addressed by providing "clean rooms" with controlled atmospheres designed to minimize temperature fluctuations. This invention, however, makes it possible to minimize temperature fluctuations outside a clean room environment.

Figure 2:
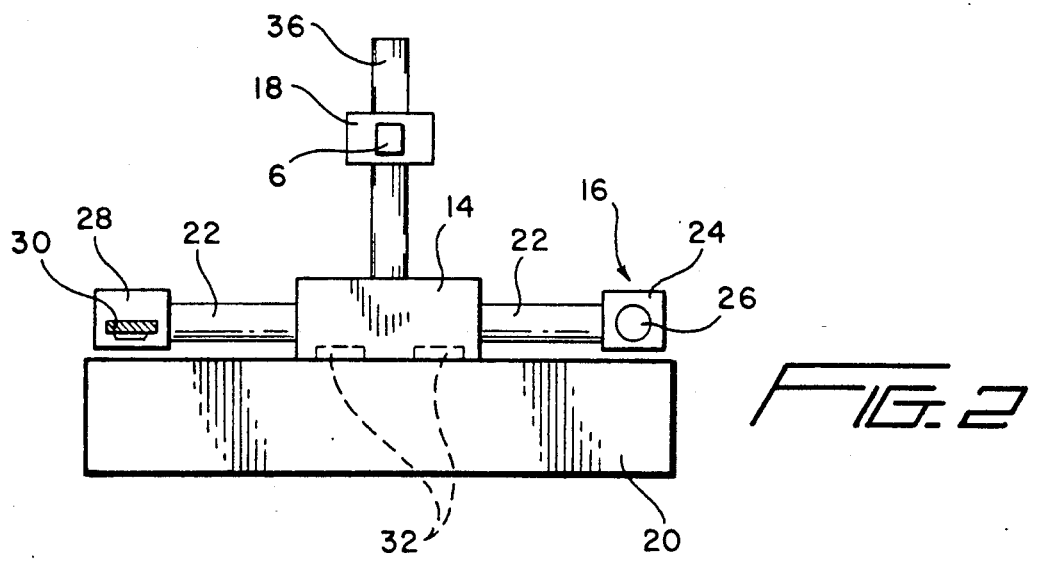
FIG. 2 is a front view of the probe-supporting assembly of the disclosed embodiment of the invention.

As shown in FIG. 1, the apparatus has a plate 2 for supporting a workpiece 4, a probe assembly 6 which has a stylus 8 with a workpiece-contacting tip 10, and a probe-supporting assembly 12 which supports the probe assembly 6 for movement along three mutually perpendicular coordinate axes. The probe-supporting assembly 12 has an X-axis carriage 14, a Y-axis carriage 16 (FIG. 2), and a Z-axis head or carriage 18 to which the probe assembly 6 is rigidly connected. As will be evident upon reading the ensuing description, the X-axis carriage may also be aptly described as an X/Y sled. The base of the X-axis carriage 14 is supported on the upper surface of a horizontal surface plate 20 by hydrostatic bearings 32. The Y-axis carriage 16 includes a transverse guide bar 22 which, as shown in FIG. 2, has one end provided with an elongated cylindrical hydrostatic bearing assembly 24 which is engaged with and guided by a stationary guide rod 26 fixed on the surface plate 20. The opposite end of the guide bar 22 is fitted with a hydrostatic bearing assembly 28 which rides on a stationary guide bar 30 which is fixed to the surface plate 20. The hydrostatic bearing in assembly 28 pushes up against the lower surface of the bar 30 in order to bias the X-axis carriage down against the surface plate 20. The Y-axis carriage 16 is thus held at a fixed orientation and guided for linear movement in a T-square-like fashion by the guide rod 26.

As shown in FIG. 1, the X-axis carriage 14 has a base provided with a first set of hydrostatic bearings 32 which support it on the upper face of the surface plate 20, and a second set of hydrostatic bearings 34 which ride on the guide bar 22 of the Y-axis carriage 16. The base of carriage 14 thus is guided for X-axis movement by the guide bar 22 which, in turn, is guided for Y-axis movement by the rod 26 as previously described.

The X-axis carriage 14 has a pair of vertical guide posts 36 upon which the Z-axis carriage 18 is slidably mounted. As shown diagrammatically, the carriage 18 is moved vertically by a motor 38 which rotates a lead screw 40 which, in turn, is threadedly connected to the Z-axis carriage 18. Similar drive motors and lead screws are provided to move the carriages 14 and 16 in the directions of their respective axes.

The positions of the carriages 14, 16, and 18 along their respective axes are determined from conventional position sensing devices. In the illustrated embodiment, the position sensing devices are rotary encoders attached to the carriage-moving motors.

Figure 4:
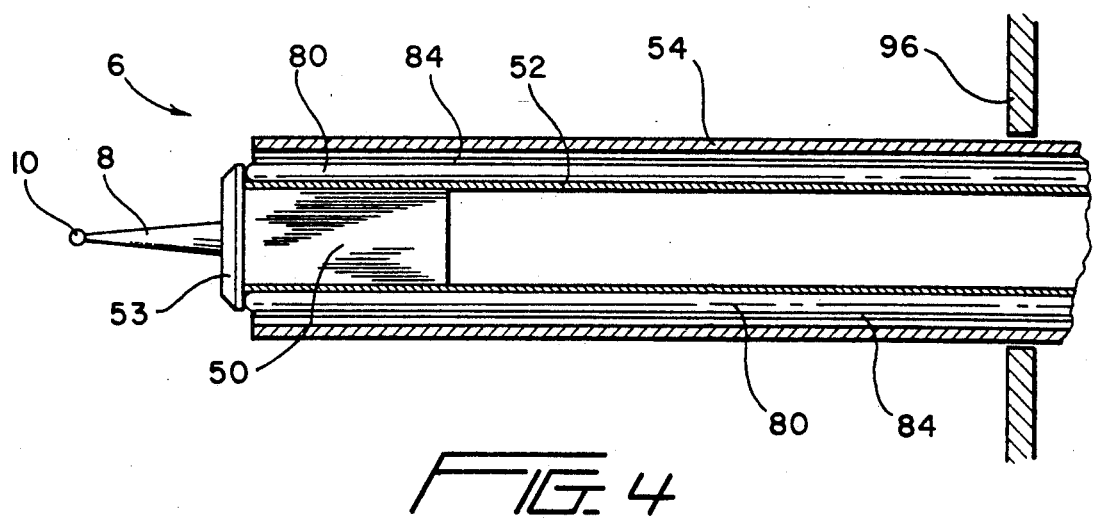
FIG. 4 is a sectional view of a forward portion of the probe assembly.

Different types of probe assemblies 6 may be used. A digital probe such as a touch trigger probe may be used, but an analog probe assembly is shown. As shown in FIG. 4, it includes a housing 50 which is rigidly connected to the Z-carriage 46 of the probe-supporting assembly 12 by a square tube 52, and a stylus mounting plate 53 which is supported on the housing 50 by internal mechanisms which permit and measure relative movement between the stylus mounting plate 53 and the housing 50 along three mutually perpendicular axes. A stylus 8 with a workpiece-contacting tip 10 is rigidly connected to the mounting plate 53. Such analog probes are known in the art. A particularly effective one, sold under the trademark SCEPTRE, is available with software from Electronic Measuring Devices, Inc., 9 Park Avenue, Flanders, N.J. 07836.

An outer square tube 54 encloses the tube 52, and these tubes are both rigidly connected to the Z-axis carriage. Any lateral forces imposed on the probe assembly thus deflect the outer tube 54 but, due to the presence of a space inside the tube 54, such deflections are not transmitted to the probe-supporting inner tube 52.

According to the invention, the probe-supporting assembly is bathed in a liquid heat transfer medium, preferably oil, which is maintained at a constant temperature to prevent thermal expansion and contraction of the probe-supporting assembly and its components. As illustrated in FIG. 1, the temperature of the oil is controlled by means of a system 55 which has a circulation pump 56, and a heat exchanger coil 57 immersed in a bath 58. The oil at the heat exchanger outlet is maintained at a precise constant temperature by thermostatically controlling the temperature of the bath 58. The bath is cooled continuously by a conventional refrigeration system 59 with an immersed coil 60, and the bath temperature is controlled by a heating system 61 which actuates a heating element 62 in response to signals from a thermostat 63 located at the outlet of coil 57. The constant temperature oil is distributed by a delivery conduit system which includes a number of branches provided with liquid outlet openings directed against different areas of the probe-supporting assembly. For example, branch 64 has outlets 65 directed against the Z-axis carriage, branch 66 has outlets 68 directed against the X-axis carriage, and an outlet 72 is directed against the guide bar 22 of the Y-axis carriage. Likewise, a branch 74 has its outlet 76 directed against the upper surface of the surface plate 20. To achieve temperature uniformity throughout the apparatus, it is expected that additional branches and outlets will be provided in order thoroughly to bathe all of the components which may affect the measurements obtained from the apparatus. Furthermore, the workpiece-supporting plate 2 and its supports may be provided with internal passages or an external bathing means to keep it at a uniform temperature to prevent reading errors attributable to expansion and contraction.

The oil from coil 57 may also be used as the lubricant supplied under pressure to the hydrostatic bearings mentioned above. A typical branch line for this purpose is shown schematically at 116.

As shown in FIG. 4, the probe assembly 6 is also thermally stabilized. A jacket formed of serially connected parallel sections 80 of tubing is pressed against the exterior surface of the square tube 52 by a shrink film 84. A branch line from coil 57 supplies oil to the jacket so that the probe assembly is kept at substantially the same temperature as the bathed portions of the apparatus.

To deter the loss of oil and to shield the apparatus from ambient air currents, the probe-supporting assembly is enclosed within a housing 90 which is shown in FIG. 1. It includes a main vessel 92 containing the surface plate 20, and an upper housing section 94 which encloses the Z-axis carriage and the components which support it and guide it. The top 95 of the main vessel 92 has a centrally located hole, and the interior dimensions of the upper section 94 are such that the probe assembly 6 will have some mobility in all three of the coordinate directions. An oil outlet opening 97 in a lower area of the housing is connected to the inlet of the heat exchanger coil 57.

Figure 3:
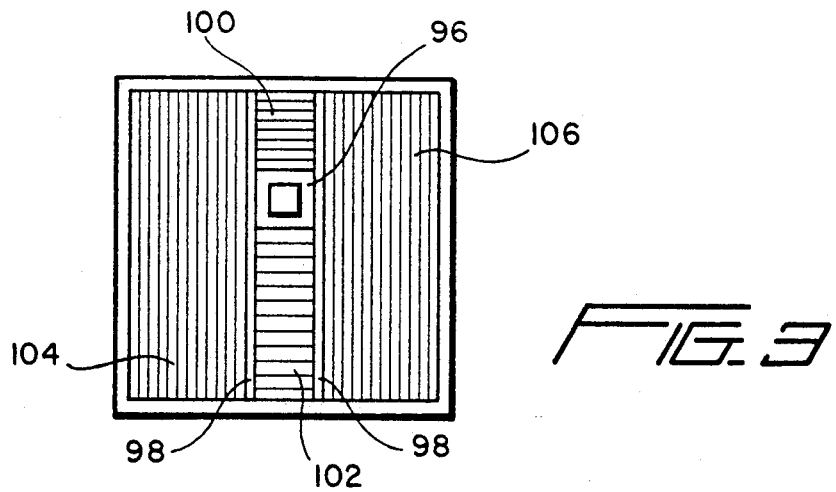
FIG. 3 is a front view of the housing wall through which the probe extends.

It will be apparent that movement of the probe in the X or Z direction will change the location of the point where the probe assembly 6 penetrates the front wall of the upper section 94 of the housing 90. Due to this circumstance, the wall is constructed to permit such movement. As shown in FIG. 3, the wall has a solid piece 96 with a probe-receiving hole therein. This piece 96 is mounted for vertical movement on a pair of vertical rails 98 which are spaced apart by a constant distance. These rails are horizontally movable in the plane of the front wall. An upper wall section 100 formed of accordion pleated material extends horizontally between the rails 98 and vertically from the upper edge of the piece 96 to the upper end of the front wall. Similarly, a lower accordion-pleated wall section 102 spans between the rails 98 and extends from the lower edge of the piece 96 to the bottom of the wall. Laterally outboard of the rails, there are two vertically pleated wall sections 104 and 106 which have their inboard edges rigidly connected to the rails. With this arrangement, it will be recognized that movement of the probe assembly will cause the piece 96 to move in the plane of the wall, thus extending and collapsing the respective accordion-pleated wall sections 100, 102, 104, and 106 so that the probe can move to various workpiece contacting positions.

To address another problem of thermal distortion which can produce erroneous readings, the apparatus is preferably provided with an auxiliary device 110 for thermally stabilizing the workpiece prior to measurement. As shown generally in FIG. 1, this is a vessel 112 containing a bath of immersion liquid, preferably oil, in which the workpiece 4' is submerged prior to measurement. A typical workpiece is placed in the bath at a predetermined position and held there long enough for its temperature and dimensions to stabilize at a predetermined temperature. Liquid may be supplied to the vessel 112 from the coil 57 but, as shown, the vessel is a self-contained unit which may be kept at a constant temperature by its own heating and/or cooling means corresponding to those described above in connection with the bath 58.

It is desirable to use the device 110 for cleaning any debris from the workpiece. For this purpose, as shown diagrammatically in FIG. 5, the device may have a vertically movable jet probe 118 which is mounted for movement on an X-axis carriage 120 which, in turn, is mounted on a Y-axis carriage 122 which moves along the rim of the vessel. An actuator is used to move the probe 118 vertically, and other actuators may be provided to move the carriages 120 and 122 in their respective directions of mobility.

Figure 6:
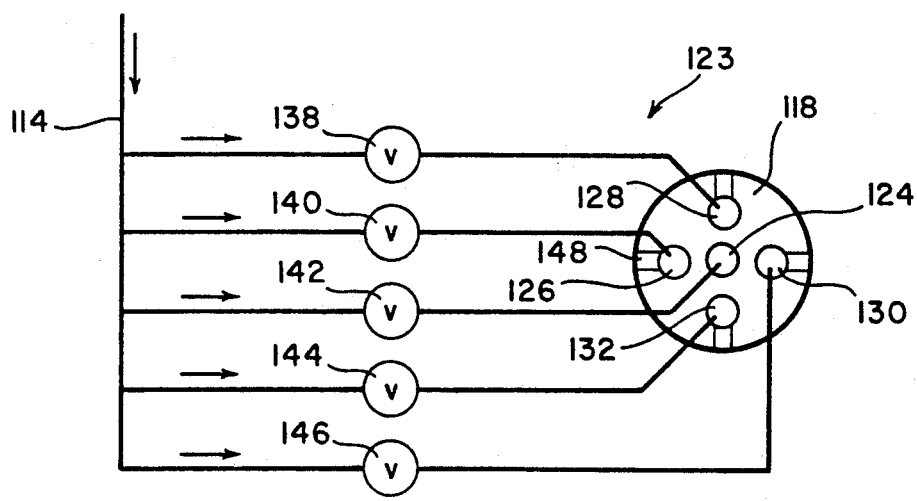
FIG. 6 is a schematic view of a distribution system which supplies liquid to the probe of the apparatus shown in FIG. 5.

The fluid distribution system 123 associated with the jet probe 118 is shown in FIG. 6 where it will be seen that the probe has five longitudinal passages for cleansing fluid. The center passage 124 has an axial outlet, and each of the other passages 126, 128, 130, and 132 has a lateral outlet opening for releasing a jet or stream of liquid into the immersion bath. Liquid is supplied to the line 114 which has branches leading to a set of valves 138, 140, 142, 144, and 146 each of which is connected to a respective passage in the probe 118.

Figure 5:
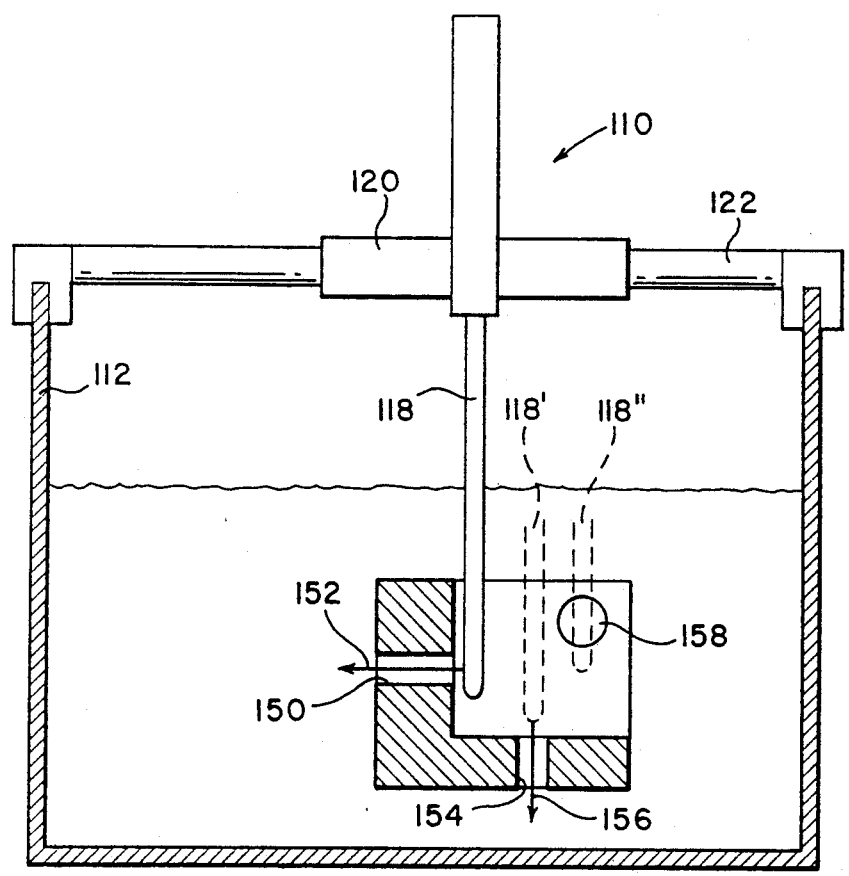
FIG. 5 is an enlarged view of the apparatus used to bring workpieces to a predetermined constant temperature before they are measured.

As shown in FIG. 5, the probe has been moved to a position where the lateral outlet 148 of passage 126 is directed into a hole 150 in the workpiece. When so positioned, the valve 140 is opened, causing a liquid stream to be discharged through the hole as shown by arrow 152 to remove any debris that may be there. Likewise, in broken lines, FIG. 5 shows the probe at a position 118' where it is aligned with a hole 154, and the valve 142 is opened to cause a stream of liquid to flow from the probe's axial outlet in the direction indicated by the arrow 156. Another position of the probe is shown in broken lines at 118" where the valve 138 is opened to permit liquid to flow through the outlet 128 and into the hole 158.

Persons familiar with the field of the invention will realize that it may take many different forms. For example, the cleansing probe 118 may be provided with only one lateral outlet opening, and the probe is rotatable about its longitudinal axis. To vary the inclination angle of such an outlet opening, the longitudinal axis of the probe may be inclinable.

The disclosed probe supporting assembly is described only by way of example. Many different types of probe supporting arrangements are known in the metrology field, and the invention is applicable to substantially all of them. The carriages may be supported and guided differently. The coordinate axis system may have less than three axes, and it may have one or more nonlinear axes. Instead of being stationary, the workpiece may be movable in one or more coordinate axis directions. Movement in the X, Y, and Z directions can be produced manually or by actuators operated in response to signals from a worker or a computer. The actuators may be electrical, mechanical, hydraulic, etc. The position-sensing means may be any conventional type such as inductive, Moire fringe, phase quadrature, interferometric, etc.

The system 55 is preferably a recirculating chiller system manufactured and sold by NESLAB INSTRUMENTS INC., Portsmouth, N.H. 03801. These systems include the heat exchanger, a circulating pump, and a refrigeration system for cooling the liquid in the heat exchanger. The oil in the vessel 58 is continuously recirculated at a precisely controlled temperature, pressure and flow rate.

Oil is the preferred heat exchange liquid, but other liquids may be used. The probe support assembly can be completely immersed in the heat exchange liquid, but it preferably receives a shower-like or cascading temperature control bath as shown. The entire machine is jacketed in thermal insulation to deter heat loss and to eliminate sweating.

In view of the many forms the invention may take, it is emphasized that the invention, rather than being limited to the disclosed structures, is embracing of variations, modifications and improvements which fall within the spirit of the following claims.

I claim:

1. Measuring apparatus, comprising
   a probe-supporting assembly,
   a probe assembly mounted on said probe-supporting assembly, said probe assembly including a workpiece-contacting member which is movable to positions where the workpiece-contacting member contacts a workpiece,
   said probe-supporting assembly including guide means for guiding the probe assembly for movement along a set of coordinate axes,
   position-sensing means for providing values which indicate positions of the workpiece-contacting member when it contacts a workpiece,
   means for bathing the probe-supporting assembly in a liquid heat transfer medium, and
   means for controlling the temperature of the liquid heat transfer medium to maintain it at a constant temperature to prevent thermal expansion and contraction of said probe-supporting assembly,
   a housing which encloses the probe-supporting assembly to deter loss of liquid heat transfer medium and to shield the probe-supporting assembly from ambient air currents,
   said housing having a wall with an opening through which the probe assembly extends, said wall including deformable components which enable the opening and the probe assembly to move parallel to said wall.

2. Measuring apparatus according to claim 1 wherein the means for bathing the probe-supporting assembly includes a plurality of conduits having liquid outlet openings directed against different areas of the probe-supporting assembly.

3. Measuring apparatus according to claim 1 wherein the deformable components are accordion-pleated sections of the wall.

4. Measuring apparatus, comprising
   a probe-supporting assembly,
   a probe assembly mounted on said probe-supporting assembly, said probe assembly including a workpiece-contacting member which is movable to positions where the workpiece-contacting member contacts a workpiece,
   said probe-supporting assembly including guide means for guiding the probe assembly for movement along a set of coordinate axes,
   position-sensing means for providing values which indicate positions of the workpiece-contacting member when it contacts a workpiece,
   means for bathing the probe-supporting assembly in a liquid heat transfer medium, and
   means for controlling the temperature of the liquid heat transfer medium to maintain it at a constant temperature to prevent thermal expansion and contraction of said probe-supporting assembly,
   a housing which encloses the probe-supporting assembly to deter loss of liquid heat transfer medium and to shield the probe-supporting assembly from ambient air currents.

said means for controlling the temperature of the liquid heat transfer medium including a thermostatically controlled heat exchanger. a liquid outlet opening in the housing. said heat exchanger having an inlet connected to said liquid outlet opening, said heat exchanger having an outlet which delivers the liquid heat transfer medium to said probe-supporting assembly.

5. Measuring apparatus, comprising a probe-supporting assembly.

a probe assembly mounted on said probe-supporting assembly. said probe assembly including a workpiece-contacting member which is movable to positions where the workpiece-contacting member contacts a workpiece.

said probe-supporting assembly including guide means for guiding the probe assembly for movement along a set of coordinate axes.

position-sensing means for providing values which indicate positions of the workpiece-contacting member when it contacts a workpiece.

means for bathing the probe-supporting assembly in a liquid heat transfer medium. and means for controlling the temperature of the liquid heat transfer medium to maintain it at a constant temperature to prevent thermal expansion and contraction of said probe-supporting assembly.

a premeasurement treatment device for bringing a workpiece to a given uniform temperature prior to measurement. said premeasurement treatment device including a vessel containing a bath of immersion liquid in which the workpiece is submerged, and means for maintaining the immersion liquid at a temperature which is substantially constant.

6. Measuring apparatus according to claim 5 including a nozzle with an outlet which is submerged in the immersion liquid for directing a stream of the immersion liquid against areas of a workpiece submerged in the immersion liquid.

7. Measuring apparatus according to claim 6 including means for moving the nozzle along mutually perpendicular coordinate axes.

8. Measuring apparatus according to claim 5 including a thermostatically controlled heat exchanger for controlling the temperature of the immersion liquid; said thermostatically controlled heat exchanger having an inlet connected to said immersion vessel. and an outlet in said immersion vessel.

9. Measuring apparatus. comprising a probe-supporting assembly.

a probe assembly mounted on said probe-supporting assembly, said probe assembly including a workpiece-contacting member which is movable to positions where the workpiece-contacting member contacts a workpiece, said probe-supporting assembly including guide means for guiding the probe assembly for movement along a set of coordinate axes, position-sensing means for providing values which indicate positions of the workpiece-contacting member when it contacts a workpiece, means for bathing the probe-supporting assembly in a liquid heat transfer medium, and means for controlling the temperature of the liquid heat transfer medium to maintain it at a constant temperature to prevent thermal expansion and contraction of said probe-supporting assembly, said probe assembly including a passage for receiving a heat exchange fluid, and means for circulating a heat exchange fluid through said passage.

10. Measuring apparatus including a premeasurement treatment device for placing a workpiece at a given uniform temperature prior to measurement, said premeasurement treatment device including a vessel containing a bath of immersion liquid in which the workpiece is submerged, and means for maintaining the bath at a temperature which is substantially constant.

a nozzle with an outlet which is immersed in the bath for directing a stream of the immersion liquid against areas of a workpiece submerged in the bath.

11. Measuring apparatus according to claim 10 including means for moving the nozzle along mutually perpendicular coordinate axes.

12. Measuring apparatus according to claim 10 including a thermostatically controlled heat exchanger for controlling the temperature of the immersion liquid; said thermostatically controlled heat exchanger having an inlet connected to said immersion vessel, and an outlet in said immersion vessel.

* * * * *